(12) United States Patent
Brittingham et al.

(10) Patent No.: US 7,887,295 B2
(45) Date of Patent: Feb. 15, 2011

(54) Z-NOTCH SHAPE FOR A TURBINE BLADE

(75) Inventors: Robert Alan Brittingham, Piedmont, SC (US); Asif Iqbal Ansari, Raipur (IN)

(73) Assignee: General Electric Company, Schenectady, NY (US)

( * ) Notice: Subject to any disclaimer, the term of this patent is extended or adjusted under 35 U.S.C. 154(b) by 737 days.

(21) Appl. No.: 11/936,920

(22) Filed: Nov. 8, 2007

(65) Prior Publication Data

US 2009/0123268 A1 May 14, 2009

(51) Int. Cl.
*F01D 5/22* (2006.01)
(52) U.S. Cl. .................... 416/189; 416/191; 416/223 A
(58) Field of Classification Search .................. 416/189, 416/191, 223 A, 243
See application file for complete search history.

(56) References Cited

U.S. PATENT DOCUMENTS

| | | | |
|---|---|---|---|
| 5,980,209 A | 11/1999 | Barry et al. | |
| 6,471,480 B1 | 10/2002 | Balkcum, III et al. | |
| 6,685,434 B1 | 2/2004 | Humanchuk et al. | |
| 6,722,851 B1 | 4/2004 | Brittingham et al. | |
| 6,851,931 B1 * | 2/2005 | Tomberg | 416/189 |
| 6,857,853 B1 * | 2/2005 | Tomberg et al. | 416/192 |
| 6,893,216 B2 | 5/2005 | Snook et al. | |
| 6,910,864 B2 | 6/2005 | Tomberg | |
| 6,910,868 B2 | 6/2005 | Hyde et al. | |
| 6,923,623 B2 | 8/2005 | Cleveland et al. | |
| 6,994,520 B2 | 2/2006 | Humanchuk et al. | |
| 7,063,509 B2 | 6/2006 | Snook et al. | |

\* cited by examiner

*Primary Examiner*—Edward Look
*Assistant Examiner*—Dwayne J White
(74) *Attorney, Agent, or Firm*—Cantor Colburn LLP

(57) ABSTRACT

In one embodiment, a turbine bucket includes: a tip shroud with a front edge and a following edge, the front edge and the following edge including a Z-Notch profile according to the Cartesian coordinate values of X, Y and Z set forth in Table I; wherein the coordinate values are dimensional values representing a distance from an origin of an internal coordinate system for the bucket; and wherein when the X and Y values are connected by smooth continuing arcs, the Z-Notch profile is defined. A turbine is provided.

15 Claims, 3 Drawing Sheets

Z-NOTCH SHAPE FOR A TURBINE BLADE

BACKGROUND OF THE INVENTION

1. Field of the Invention

This invention relates to gas turbine engines, and in particular to a design for a shroud tip for a turbine blade (i.e., a turbine bucket).

2. Description of the Related Art

A gas turbine includes many moving parts, each of which may experience stress during operation. As an example, the gas turbine includes a turbine for extracting energy from hot gas exiting from a combustor. In order to extract this energy, a plurality of buckets are provided in a series of stages. Each of the buckets include various components. For example, each bucket generally includes an airfoil (as a surface for absorbing the energy), a root (for anchoring the bucket to a shaft) and a shroud tip (which maintains alignment of the blade during operation).

Each of the buckets is subjected to extreme temperatures and mechanical stress. These factors generally affect the entire bucket. This is problematic from a standpoint of maintenance and longevity. For example, thermal expansion may induce particular degrees of stress at the shroud tip, where adjacent tips are in contact with each other.

Thus, what is needed is an improved design for a shroud tip. Preferably, the improved design for the shroud tip provides for reductions in stress and therefore results in improved performance and longevity of the bucket.

BRIEF DESCRIPTION OF THE INVENTION

In one embodiment, a turbine bucket includes: a tip shroud with a front edge and a following edge, the front edge and the following edge including a Z-Notch profile according to the Cartesian coordinate values of X, Y and Z set forth in Table I; wherein the coordinate values are dimensional values representing a distance from an origin of an internal coordinate system for the bucket; and wherein when the X and Y values are connected by smooth continuing arcs, the Z-Notch profile is defined.

In another embodiment, a turbine includes: a turbine wheel having a plurality of buckets, each bucket including a tip shroud with a front edge and a following edge, the front edge and the following edge including a Z-Notch profile according to the Cartesian coordinate values of X, Y and Z set forth in Table I; wherein the coordinate values are dimensional values representing a distance from an origin of an internal coordinate system for the bucket; and wherein when the X and Y values are connected by smooth continuing arcs, the Z-Notch profile is defined.

In a further embodiment, a turbine includes: a turbine wheel having a plurality of buckets, each bucket including a tip shroud with a front edge and a following edge, the front edge and the following edge including a Z-Notch profile according to one of scaled up and scaled down Cartesian coordinate values of X, Y and Z set forth in Table I; wherein the coordinate values are dimensional values representing a distance from an origin of an internal coordinate system for the bucket; and wherein when the X and Y values are connected by smooth continuing arcs, the Z-Notch profile is defined.

DETAILED DESCRIPTION OF THE INVENTION

Disclosed is a design for a tip shroud of a turbine bucket. The design, referred to as a "Z-Notch" design (or Z-Notch profile), creates an interlocking condition between adjacent buckets during operation, providing engagement of adjacent buckets while reducing stress. The Z-Notch design may be referred to as including a "Z shaped profile." The Z-Notch shaped profile provides for, among other things, improved contact interaction between turbine blades in a high pressure turbine; improved mechanical blade loading during engine operating condition; improved distribution of mass in the tip shroud and improved control of any gaps between adjacent shrouds in the regions of the Z-Notch. Before embodiments are discussed in detail, certain definitions are provided.

The term "gas turbine" refers to a continuous combustion engine. In an exemplary embodiment, the gas turbine generally includes a compressor, a combustion chamber (referred to as a "combustor") and a turbine. During operation, the combustion chamber emits hot gases that are directed to the turbine. The term "bucket" relates to a blade included in the turbine. Each bucket generally has an airfoil shape to provide for converting the hot gases impinging on the bucket into rotational work. The term "turbine stage" relates to a plurality of buckets circumferentially disposed about a section of a shaft of the turbine. The buckets of the turbine stage are arranged in a circular pattern about the shaft.

Figure 1:
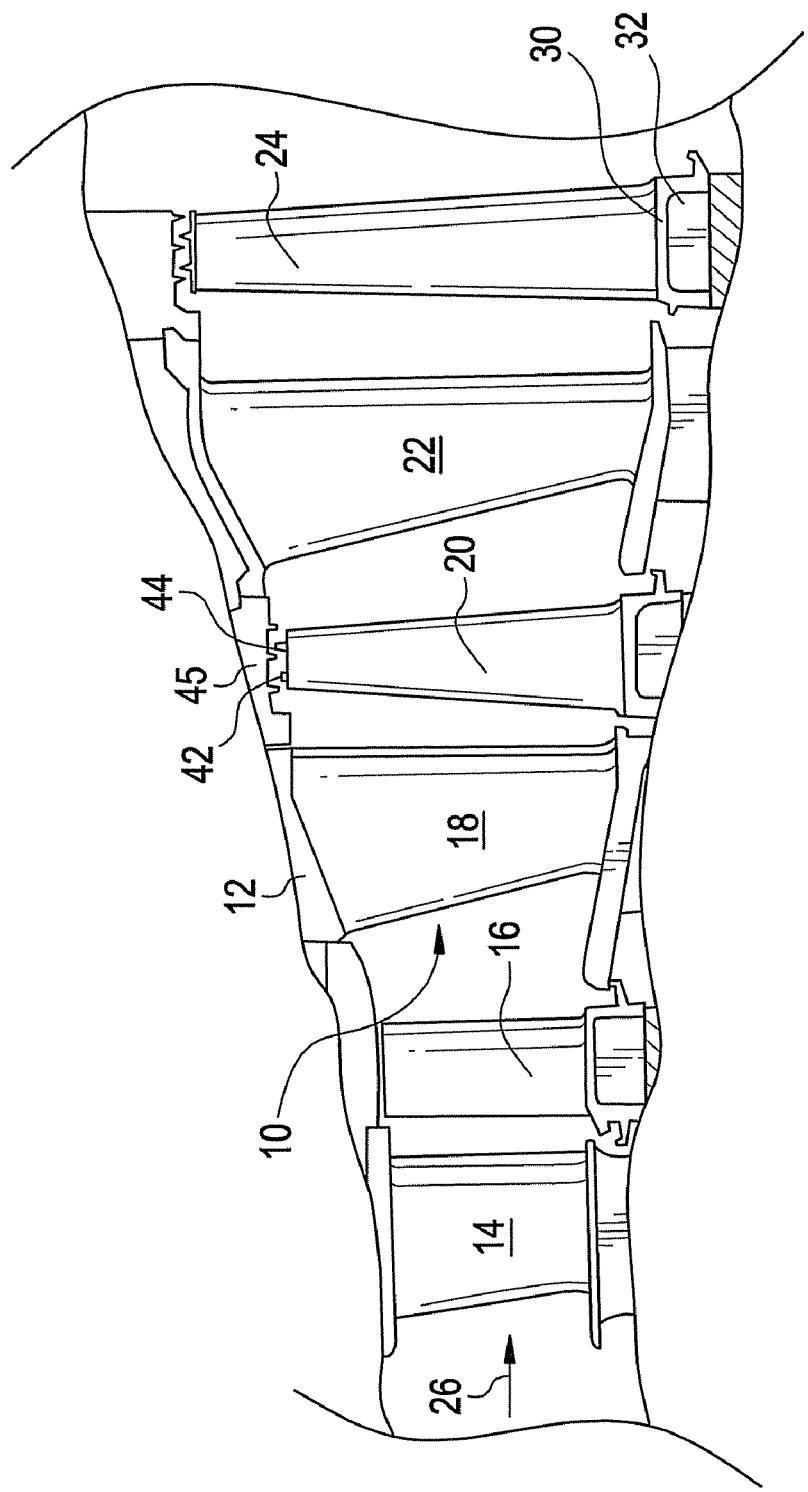
FIG. 1 illustrates an exemplary embodiment of aspects of a gas turbine.

Referring now to the drawing figures, particularly to FIG. 1, there is illustrated a hot gas path, generally designated 10, of a gas turbine 12 including a plurality of turbine stages. In this example, three stages are illustrated. The first stage includes a plurality of circumferentially spaced nozzles 14 and buckets 16. The nozzles 14 are circumferentially spaced one from the other and fixed about the axis of the rotor. The first stage buckets 16, of course, are mounted on the turbine rotor wheel, not shown. A second stage of the turbine 12 is also illustrated, including a plurality of circumferentially spaced nozzles 18 and a plurality of circumferentially spaced buckets 20, also mounted on the rotor. The third stage is also illustrated including a plurality of circumferentially spaced nozzles 22 and buckets 24 mounted on the rotor. It will be appreciated that the nozzles and buckets lie in the hot gas path 10 of the turbine 12, the direction of flow of the hot gas through the hot gas path 10 being indicated by the arrow 26.

Figure 2:
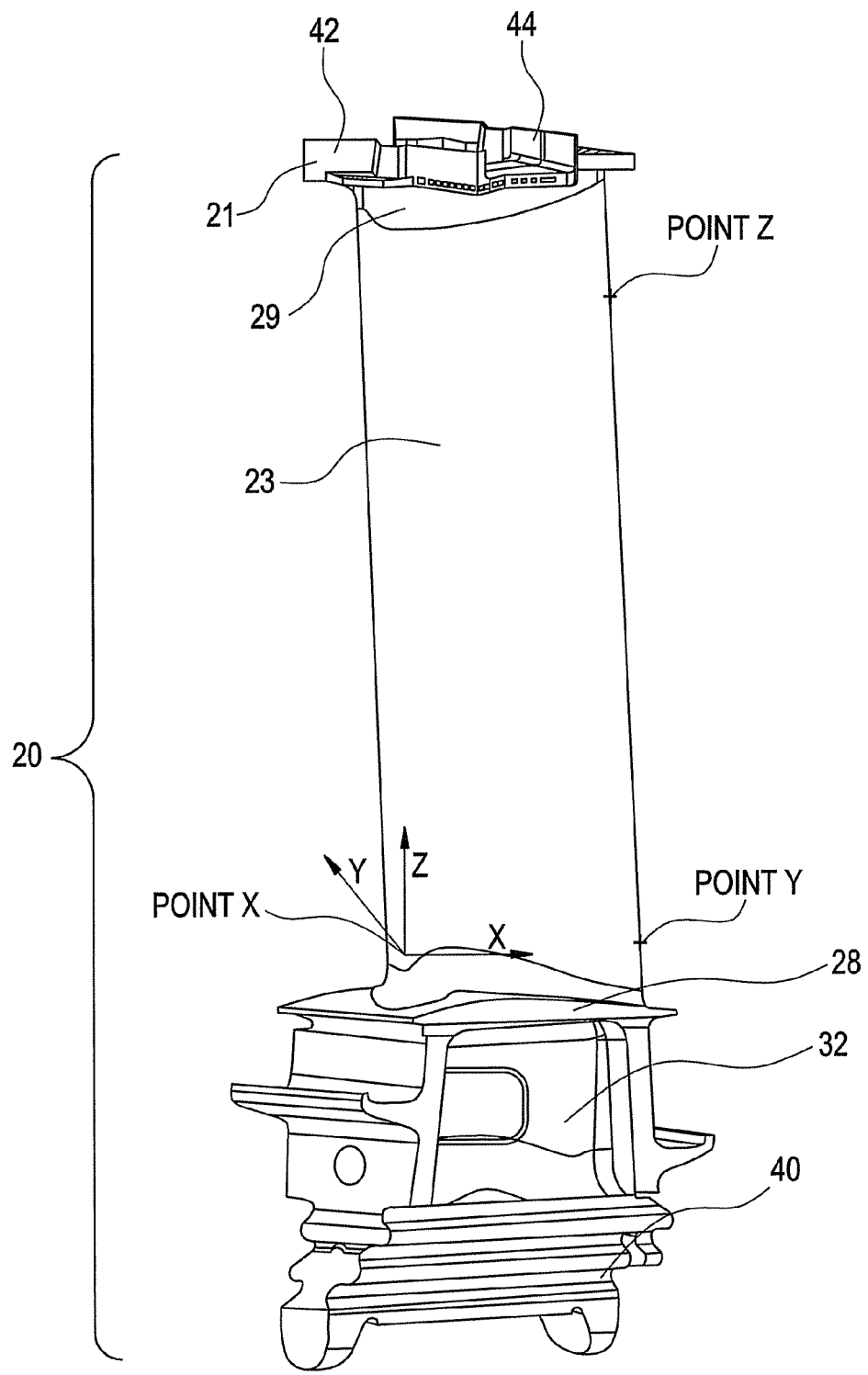
FIG. 2 illustrates aspects of a second stage bucket.

Now also with reference to FIG. 2, each bucket 20 of the second stage is provided with a platform 30, a shank 32 and a dovetail 40, for connection with a complementary-shaped mating dovetail, (not shown), on a rotor wheel forming part of the rotor. Each of the second stage buckets 20 also includes an airfoil 23 (FIG. 2) having an airfoil profile at any cross-section along the airfoil 23 from the platform 28 to the airfoil tip 29.

Figure 3:
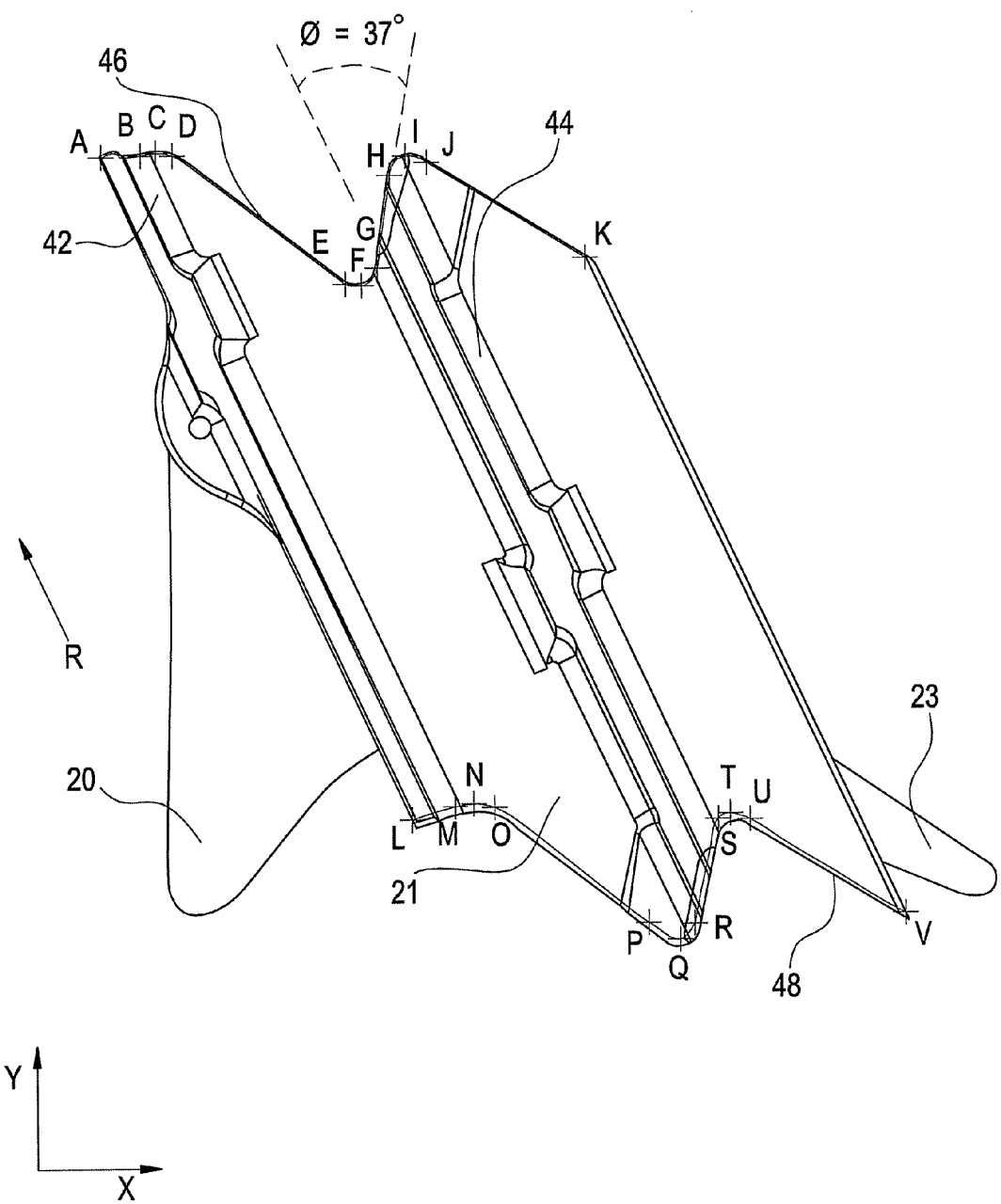
FIG. 3 aspects of a Z-notch tip shroud.

Each of the second stage buckets 20 is also provided with a tip shroud, generally designated 21 (FIG. 2). Each tip shroud 21 is preferably formed integrally with the bucket 20 and each tip shroud 21 engages at opposite ends adjacent tip shrouds 21 of adjacent buckets 20 to form a generally annular ring or shroud circumscribing the hot gas path at the location of the second stage buckets. As illustrated in FIG. 2, the tip shroud 21 of the second stage bucket 20 includes at least one, (for example, a pair of) axially spaced seals 42 and 44 along its radial outer surface and which seals 42 and 44 form a pair of axially spaced, continuous seal rings about the tip shroud 21 for sealing with a static shroud 45 (FIG. 1) fixed to the turbine casing. As illustrated in FIG. 3, it will be appreciated that the tip shroud 21 includes shaped front edge 46 and following edge 48. That is, the front edge 46 and the following edge 48 lie on opposite axial facing sides of the tip shroud 21 in the hot gas path 10. Also illustrated in FIG. 3 are a number of points, referenced as A through V. Note that the points A through K lie along the front edge 46 and points L through V lie along the following edge 48 of the tip shroud 21, relative to a general direction of rotation, R, of the rotor.

To define the shape of the front edge 46 and the following edge 48, respectively (i.e., the profiles formed by those edges), a unique set or loci of points in space are provided. Particularly, in a Cartesian coordinate system of X, Y and Z axes, X and Y values are given in Table I below and define the profile of the front edge 46 and the following edge 48 at various locations therealong. The coordinate system is provided as an internal coordinate system for the bucket. Accordingly, certain aspects of the bucket 20 may be varied (such as dimensions of the dovetail 40), without impact upon the coordinates defining the unique set or loci of points.

In this example, the coordinate system is set relative to the airfoil 23 and is fully defined by points X, Y, and Z. Points X and Y are both located 39.600 inches above the cold rotor centerline. Point X lies at the intersection of the airfoil mean camber line and the leading-edge airfoil surface. Point Y lies at the intersection of the airfoil mean camber line and the trailing-edge airfoil surface. Point Z is located 49.862 inches above the cold rotor centerline and lies at the intersection of the airfoil mean camber line and the airfoil trailing-edge surface. The origin of the coordinate system is located at Point X. Points X and Y define the positive X-axis. Points X, Y, and Z define the positive X-Z plane. The Y-axis is then defined using Right-Hand Rule methodology.

The values for the X, Y and Z coordinates are set forth in inches in Table I, although other units of dimensions may be used when the values are appropriately converted. By defining X and Y coordinate values at selected locations relative to the origin of the X, Y, Z axes, the locations of the points referenced as A through V can be ascertained. By connecting the X, Y and Z values with smooth, continuing arcs along each of the front edge 46 and following edge 48, each edge profile can be ascertained.

It will be appreciated that these values represent the front edge and following edge profiles at ambient, non-operating or non-hot conditions (i.e., cold conditions). More specifically, the tip shroud 21 has a front edge 46 defining a front edge profile substantially in accordance with the Cartesian coordinate values of X and Y at reference points A through K set forth in Table I, wherein the X and Y values are distances in inches from the origin. When points A through K are connected by smooth, continuing arcs, points A through K define the front edge tip shroud profile. Similarly, the tip shroud 21 has a following edge 48 defining a following edge profile substantially in accordance with Cartesian coordinate values of X and Y at points L through V set forth in Table I, wherein X and Y are distances in inches from the same origin. When points L through V are connected by smooth, continuing arcs, points L through V define the following edge tip shroud profile. By defining the profile for each of the front edge 46 and the following edge 48 in an X, Y coordinate system having a single origin, the shape of the tip shroud 21 along the front edge 46 and the following edge 48 is defined.

As a matter of convenience, the profiles described herein are collectively referred to as a "Z-Notch" profile. In general, the Z-Notch design reduces or substantially reduces stress in the tip shroud 21 and the bucket 20. More specifically, the Z-Notch profile addresses primary failure modes related to the stress in the tip shroud 21. The first failure mode (in no particular order) is LCF, or a crack attributable to fatigue. The second failure mode is creep, which could manifest itself through cracks or through elevated strain and local deformation in the stressed region. As an example, the stressed region could be the Z-Notch fillet region or the fillet region which connects the tip shroud 21 to the airfoil 23. A third failure mode is High Cycle Fatigue (HCF). HCF is a caused by alternating stress coupled with mean stress, leading to cracks and thus part failure. Alternating stress is generally caused by vibration, while mean stress is generally caused by mechanical and thermal loading.

The Z-Notch profile disclosed herein may be incorporated into buckets 20 of various stages in the turbine 12. In the example, provided herein, the tip shroud 21 including the Z-Notch design is part of a stage two bucket 20. However, the Z-Notch profile may be used advantageously in other stages.

The Z-Notch profile addresses limitations of existing designs (i.e. high stress in the near contact fillet region). Additionally, the Z-Notch design provides adequate aeromechanic damping and improved mass distribution to address LCF and creep life of the tip shroud 21 and the bucket 20. It should be noted that the resulting improved mass distribution has further beneficial impact on stress reduction in the airfoil 23 and the fillet region between the airfoil 23 and the shank.

The Z-Notch profile may be adapted as needed. For example, the Z-Notch profile may be adapted to account for a degree of tilt or lean in the airfoil 23 relative to the platform 28. Accordingly, certain statistical analyses or other modeling techniques may be used.

Exemplary parameters for the Z-Notch design are provided. In one embodiment, the Z-notch profile includes an hard face profile and hard face angle of thirty seven (37) degrees. In one embodiment, a Z-Notch fillet radius is about 0.090" inches. In this embodiment, the Z-Notch fillet radius distributes the localized stresses and improves the stress distribution. The side face profile is selected for providing necessary flexibility to the Z-Notch design and properly distributing the mass of each tip shroud 21. Also in this embodiment, a resultant Z-Notch profile improves the stress distribution, reduces the chances of shingling, and provides improved life of the tip shroud 21.

TABLE 1

Points for Z-Notch profile

| Pt. # | X | Y | Z |
|---|---|---|---|
| A | −0.324 | 3.396 | 11.103 |
| B | −0.158 | 3.449 | 11.103 |
| C | −0.039 | 3.457 | 11.103 |
| D | 0.071 | 3.409 | 11.103 |
| E | 0.794 | 2.852 | 11.103 |
| F | 0.880 | 2.839 | 11.103 |
| G | 0.937 | 2.906 | 11.103 |
| H | 1.028 | 3.358 | 11.103 |
| I | 1.080 | 3.423 | 11.103 |
| J | 1.163 | 3.418 | 11.103 |
| K | 1.954 | 2.937 | 11.103 |
| L | 1.125 | 0.318 | 11.567 |
| M | 1.329 | 0.381 | 11.567 |
| N | 1.448 | 0.388 | 11.567 |
| O | 1.556 | 0.340 | 11.567 |
| P | 2.282 | −0.222 | 11.567 |
| Q | 2.369 | −0.235 | 11.567 |
| R | 2.426 | −0.169 | 11.567 |
| S | 2.515 | 0.270 | 11.567 |
| T | 2.568 | 0.335 | 11.567 |
| U | 2.651 | 0.329 | 11.567 |
| V | 3.395 | −0.128 | 11.567 |

In general, the Z-Notch profile is described in two-dimensions (2D). In this example, the Z-coordinate is provided to place a two-dimensional curve in a three-dimensional space (as shown in FIG. 2). The curve is extruded along a vector to create a flat surface.

In some embodiments, a tolerance for any one of the points is about plus or minus 0.015" around the nominal profile provided in Table I, in any one or more of the X, Y and Z directions.

It should be recognized that the dimensions provided herein are merely illustrative and are not limiting. That is, for example, other embodiments may be realized. Examples include embodiments that are proportionately sized (scaled up or scaled down), or of other dimensions or sizes (as may be determined by a variety of models). Accordingly, variations devised by extrapolation, interpolation, proportionate adjustment and by other techniques are within the teachings herein.

In some embodiments, the bucket 20 a hard face profile includes a hard face angle ($\theta$) of about thirty seven (37) degrees (shown in FIG. 3).

The Z-notch profile for tip shrouded buckets, has a variety of advantages, some of which include: better control on distribution of the mass in and around the Z-notch, which results in lower stresses and improves mechanical life of the bucket; smooth engagement of turbine buckets during engine operation; reduced chances of shingling and hence reduction in failures.

While the invention has been described with reference to an exemplary embodiment, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbine bucket comprising:
    a tip shroud with a front edge and a following edge, the front edge and the following edge comprising a Z-Notch profile according to the Cartesian coordinate values of X, Y and Z set forth in Table I;
    wherein the coordinate values are dimensional values representing a distance from an origin of an internal coordinate system for the bucket; and
    wherein when the X and Y values are connected by smooth continuing arcs, the Z-Notch profile is defined.

2. The turbine bucket of claim 1 forming part of a second stage of a turbine.

3. The turbine bucket of claim 1 wherein a hard face profile and a hard face angle each comprise an angle of about thirty seven (37) degrees.

4. The turbine bucket of claim 1 wherein the tip shroud comprises at least one axially spaced seal.

5. The turbine bucket of claim 1 wherein a Z-Notch fillet radius is about 0.090" inches.

6. The turbine bucket of claim 1, wherein the Z-Notch profile reduces at least one of low cycle fatigue, creep and high cycle fatigue.

7. The turbine bucket of claim 1, wherein a tolerance for any one of the coordinate values is about plus or minus 0.015" in any one or more of the X, Y and Z directions.

8. A turbine comprising:
    a turbine wheel having a plurality of buckets, each bucket comprising a tip shroud with a front edge and a following edge, the front edge and the following edge comprising a Z-Notch profile according to the Cartesian coordinate values of X, Y and Z set forth in Table I;
    wherein the Z values are dimensional values representing a distance from an origin of an internal coordinate system for the bucket; and
    wherein when the X and Y values are connected by smooth continuing arcs, the Z-Notch profile is defined.

9. The turbine as in claim 8, wherein the bucket forms part of a second stage of the turbine.

10. The turbine as in claim 8, wherein, for at least one of the buckets, a hard face profile and a hard face angle each comprise an angle of about thirty seven (37) degrees.

11. The turbine as in claim 8, wherein the tip shroud comprises two axially spaced seals.

12. The turbine as in claim 8, wherein a Z-Notch fillet radius is about 0.090" inches.

13. The turbine as in claim 8, wherein the Z-Notch profile reduces at least one of low cycle fatigue and creep.

14. The turbine as in claim 8, wherein a tolerance for any one of the coordinate values is about plus or minus 0.015" in any one or more of the X, Y and Z directions.

15. A turbine comprising:
    a turbine wheel having a plurality of buckets, each bucket comprising a tip shroud with a front edge and a following edge, the front edge and the following edge comprising a Z-Notch profile according to one of scaled up and scaled down Cartesian coordinate values of X, Y and Z set forth in Table I;
    wherein the coordinate values are dimensional values representing a distance from an origin of an internal coordinate system for the bucket; and
    wherein when the X and Y values are connected by smooth continuing arcs, the Z-Notch profile is defined.

* * * * *